(12) United States Patent  (10) Patent No.: US 8,277,159 B2
Stimpson  (45) Date of Patent: Oct. 2, 2012

(54) MANX FASTENER

(75) Inventor: Robert William Stimpson, Isle of Man (GB)

(73) Assignee: DLP Limited, Isle Of Man (GB)

( * ) Notice: Subject to any disclaimer, the term of this patent is extended or adjusted under 35 U.S.C. 154(b) by 184 days.

(21) Appl. No.: 12/873,330

(22) Filed: Sep. 1, 2010

(65) Prior Publication Data

US 2012/0051868 A1  Mar. 1, 2012

(51) Int. Cl.
*F16B 21/00* (2006.01)

(52) U.S. Cl. ........................................ 411/349; 411/508

(58) Field of Classification Search ..................... 411/71, 411/340, 347, 349
See application file for complete search history.

(56) References Cited

U.S. PATENT DOCUMENTS

| | | | | | |
|---|---|---|---|---|---|
| 3,383,976 | A | * | 5/1968 | Schenkel | 411/62 |
| 4,668,145 | A | * | 5/1987 | Hirohata | 411/508 |
| 4,743,152 | A | * | 5/1988 | Nakayama et al. | 411/182 |
| 4,906,152 | A | * | 3/1990 | Kurihara | 411/182 |
| 6,213,700 | B1 | * | 4/2001 | Everard | 411/60.2 |
| 7,137,768 | B2 | * | 11/2006 | Maas | 411/553 |
| 7,150,596 | B2 | * | 12/2006 | Diaz et al. | 411/344 |
| 7,153,074 | B2 | * | 12/2006 | Wei | 411/21 |
| 7,393,168 | B2 | * | 7/2008 | Wei | 411/21 |
| 7,682,116 | B2 | * | 3/2010 | Cabrele et al. | 411/80.5 |

* cited by examiner

*Primary Examiner* — Gary Estremslky
(74) *Attorney, Agent, or Firm* — Pyprus Pte Ltd

(57) ABSTRACT

A splayable fastening device comprises a fastener engagable element having a screw-threaded element, at least one flexibly springable arm member which is at least in part wrapable about a screw-threaded axis of the screw-threaded element, and a retainer for retaining the said flexibly springable arm member in its wrapped or coiled condition. The retainer is movable relative to the flexibly springable arm member whereby the flexibly springable arm member is unfurlable in a clockwise or anticlockwise direction. A method of fastening to a hollow wall using such a splayable fastening device is also provided.

17 Claims, 3 Drawing Sheets

MANX FASTENER

The present invention relates to a splayable fastening device for fixing within a hollow wall, and more particularly but not necessarily exclusively to such a device with three wrapable or coilable flexibly springable arm members which, in at least its storage condition, form a triskelion configuration similarly to the Manx national symbol.

BACKGROUND OF THE INVENTION

Hollow wall fastening devices are well known for fixing items to, for example, plasterboard. The known fastening devices have splayable straight arms typically arranged similarly to an umbrella mechanism. In the closed or storage condition, the straight arms lie substantially in parallel with the longitudinal axis of the fastening device. In the open condition, the straight arms are pivoted to splay in the plane of the longitudinal axis of the fastening device but to extend at a non-parallel angle relative thereto.

These known fastening devices are therefore generally long in order to accommodate, but this becomes problematic not only for storage but also when a cavity space behind the hollow wall is particularly shallow.

The present invention seeks to provide a solution to these problems, whilst also providing a mechanically simple and compact arrangement.

SUMMARY OF THE INVENTION

According to a first aspect of the invention, there is provided a splayable fastening device comprising a fastener engagable element having a screw-threaded element, at least one flexibly springable arm member which is at least in part wrapable about a screw-threaded axis of the screw-threaded element, and a retainer which retains the said flexibly springable arm member in its wrapped condition, wherein the retainer is movable relative to the flexibly springable arm member to enable the flexibly springable arm member to unfurlable in at least one of a clockwise and anticlockwise direction.

According to a second aspect of the invention, there is provided a method of fastening to a hollow wall using a splayable fastening device, the method comprising the steps of a) providing an opening in a hollow wall having a diameter which closely matches that of a retainer of a splayable fastening device; b) inserting the splayable fastening device into the wall opening until the retainer is flush or substantially flush with the outer surface of the wall; c) engaging a screw-threaded fastener with a screw-threaded element of a fastener engagable element of the splayable fastening device; and d) urging the screw-threaded fastener into the wall opening so that a wrapped flexibly springable arm member disengages from the retainer and until the fastener engagable element and the said at least one flexibly springable arm member exit the wall opening, whereby the said at least one flexibly springable arm member unfurls in at least one of a clockwise and anticlockwise direction so as to be engagable with an interior wall surface of the hollow wall which extends from the wall opening.

The invention will now be more particularly described, by way of example only, with reference to the accompanying drawings.

DETAILED DESCRIPTION OF THE PREFERRED EMBODIMENTS

Figure 1:
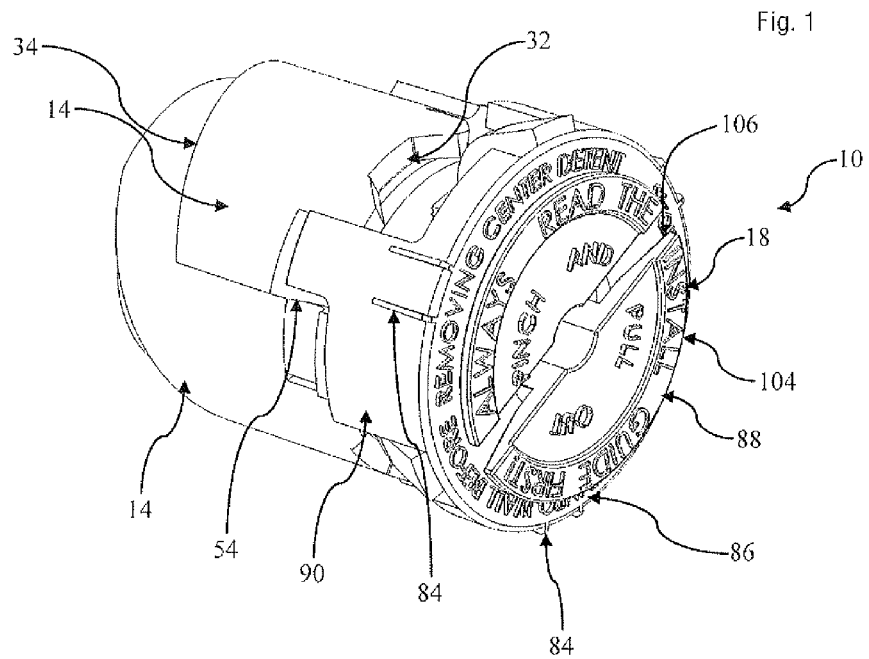
FIG. 1 shows a perspective view of one embodiment of a splayable fastening device, in accordance with the first aspect of the invention and shown in a storage condition.
Figure 2:
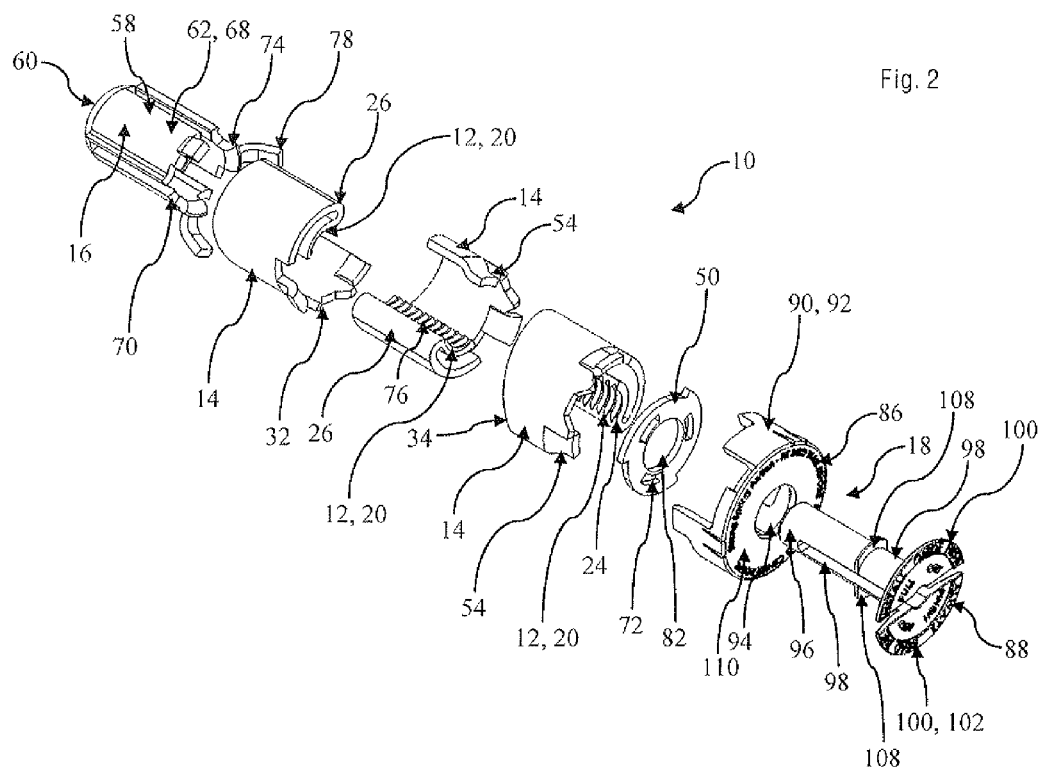
FIG. 2 is an exploded view of the splayable fastening device, when in the storage condition.
Figure 3:
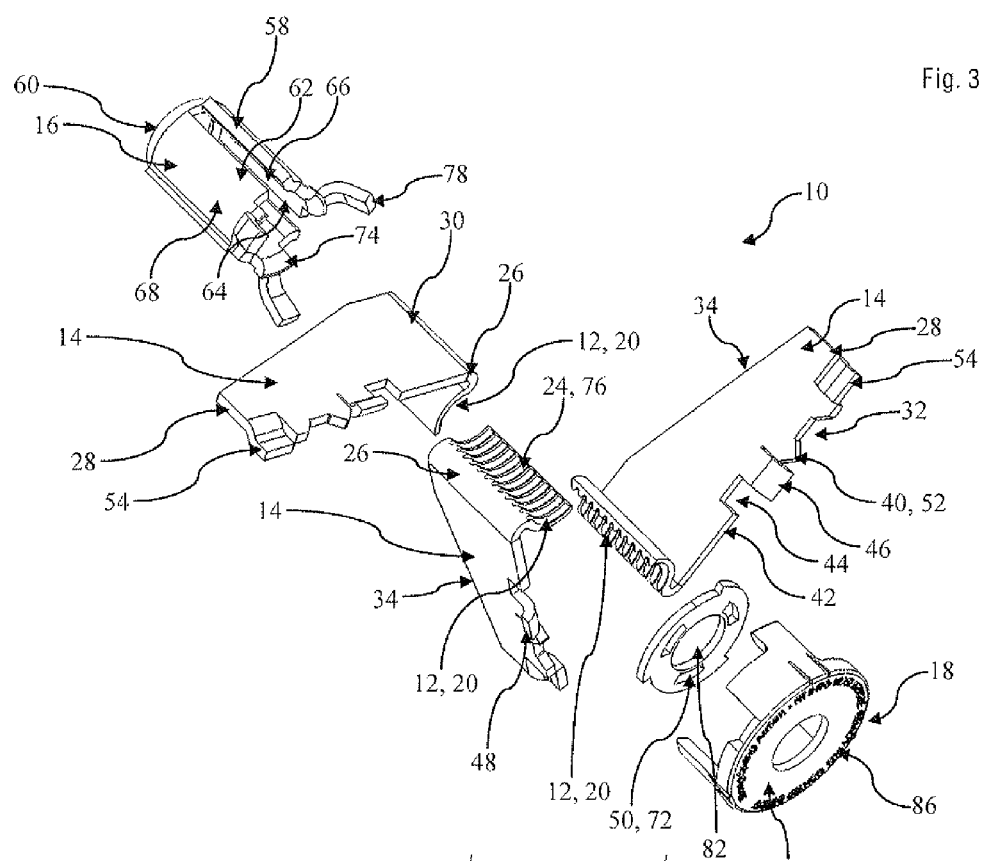
FIG. 3 is an exploded view of the splayable fastening device, with flexibly springable arm members shown unfurled in an in use condition.
Figure 4:
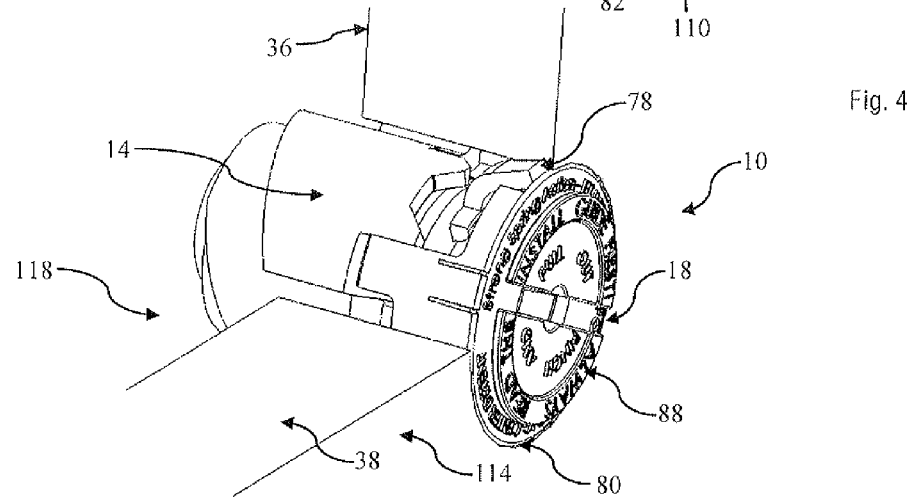
FIGS. 4 to 7 show the in use splayable fastening device inserted into a hollow wall and extended from a storage condition to an engaged condition.
Figure 5:
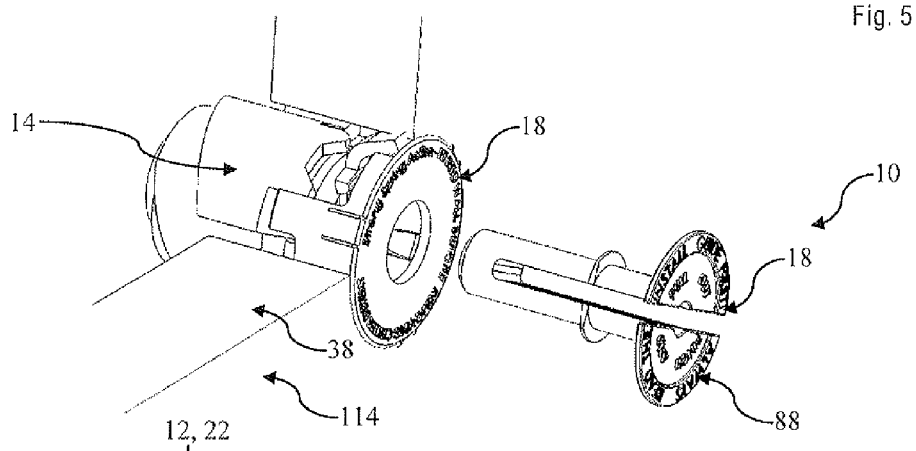
Figure 6:
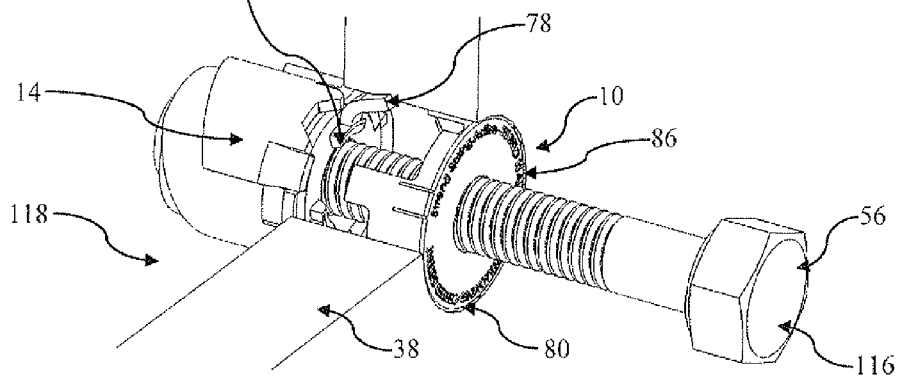
Figure 7:
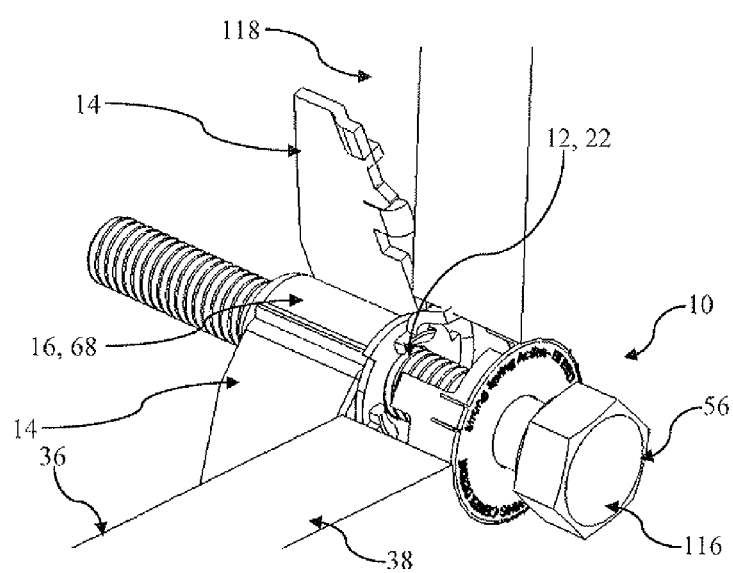

Referring firstly to FIGS. 1 to 3 of the drawings, there is shown a splayable fastening device 10 which comprises a fastener engagable element 12, three flexibly springable arm members 14, a carrier 16 and a retainer 18. The fastener engagable element 12 in this case includes three separate longitudinal arcuate wall parts 20 forming a substantially cylindrical screw-threaded opening 22. The screw-thread 24 extends along the entire or substantially entire longitudinal extent of the fastener engagable element 12, and the screw-threaded opening 22 itself is centrally axially positioned on the splayable fastening device 10.

Each arcuate wall part 20 of the fastener engagable element 12 has a uniformly or substantially uniformly curved lateral extent along its longitudinal extent, and a rectilinear longitudinal extent. Each arcuate wall part 20 describes an equiangular arc in the lateral plane so that, when longitudinal edges abut, the three arcuate wall parts 20 form or substantially form a circle in the lateral plane whereby the screw-threaded opening 22 is formed.

The fastener engagable element 12 is integrally formed as one-piece with the flexibly springable arm members 14. In this case, each arcuate wall part 20 forms a base or foot from which each arm member 14 extends outwardly in a cantilevered manner from one longitudinal edge.

Each arm member 14 extends slightly backwardly from its respective arcuate wall part 20 so as to form a hook 26. Each arm member 14 has a generally, although not necessarily exclusively, uniform thickness, and tapers in a generally outwards radial direction so as to provide a reduced height at its distal end 28 in comparison with the proximal end 30 at the respective arcuate wall part 20.

First edges 32 of the arm members 14 are substantially coplanar in a lateral plane of the splayable fastening device 10 which is normal to the rotational axis. Second edges 34 taper from the proximal end 30 to the distal end 28. The first edges 32 are adapted to engage at least in part an interior wall surface 36 of a hollow wall 38, and as such preferably include at least one pointed protrusion 40. In this embodiment, the first edge 32 of each arm member 14, in the direction from the proximal end 30 to the distal end 28, has a straight flat portion 42 which extends from the base or foot of the fastener engagable element 12 and which is intended to lie against the interior wall surface 36 for spreading a load, a recess 44 for accommodating part of the carrier 16, a laterally protruding tab 46 which has a slightly outwardly hooked distal free edge 48 for engaging the interior wall surface 36 of the hollow wall 38, the pointed protrusion 40 in this case being an interior-wall-surface engaging tooth 52 for preventing or limiting undesirable rotation of the splayable fastening device 10 following insertion through a wall and engagement with the interior wall surface 36, and a cranked tab 54 at the proximal end 30 which is cranked in an inwards direction for engagement by the retainer 18.

Each arcuate wall part 20 of the fastener engagable element 12 is preferably formed from thicker metal, being cast, machined or moulded, whereas each arm member 14 is formed of thinner metal so that it is flexible and springy. In some applications, plastics could be considered.

The carrier 16 is utilised to support each arcuate wall part 20 so as to maintain the screw-threaded opening 22 in order to receive a screw-threaded fastener 56. The carrier 16 defines a cage 58 having a ring-like base plate 60, three equi-angularly spaced longitudinal wall members 62 which extend from the base plate 60, and the aforementioned end cap 50 which in this case is also a ring-like plate. Each wall member 62 has a substantially uniformly arcuate lateral extent along its longitudinal extent, and is rectilinear or substantially rectilinear along its longitudinal extent. An interior surface 64 of each wall member 62 is thus complementarily shaped to receive a respective arcuate wall part 20 of the fastener engagable element 12. The associated arm member 14 extends through the slot 66 formed between the neighbouring wall members 62 and hooks back around the respective edge of the slot 66 to at least in part overlie the exterior surface 68 of the wall member 62. The surface engaging first edges 32 of the arm members 14 lie adjacent to the distal free edges 70 of the wall members 62 and thus the end cap 50, whereas the sloping second edges 34 lie closer to the end of the carrier 16 at which the base plate 60 is located.

End cap 50 of the carrier 16 includes apertures 72 in its rim for receiving outwardly-turned engagement tabs 74 provided on the distal free edges 70 of the wall members 62 of the carrier 16. The drawings show these engagement caps in their assembled configuration. Prior to assembly, tabs 74 and engagement tangs 78 are undeformed and coincident with the cylindrical outer surface of carrier 16. The end cap 50 is thus inserted over the distal free edges of the wall members 62 whereafter the engagement tabs 74 are pressed or formed to the deformed shape shown in the drawings to rigidly engage the respective apertures 72 and retain the cap 50. The fastener engagable element 12 is thus held captive in the cage 58 of the carrier 16. Due to the dimensions of the cage 58, the arcuate wall parts 20 are held closely together so that the screw-threaded portions 76 on the interior surface 64 of each arcuate wall part 20 together define the complete screw-thread 24 along a bore of the screw-threaded opening 22.

The engagement tang 78 is also provided on the distal free edges 70 of the wall members 62. Each tang 78 is outwardly turned and projects above the respective engagement tab 74. The engagement tang 78 is adapted to prevent or inhibit withdrawal of the carrier 16 from a wall opening 80, once inserted, and to assist in the location and retention of the device where the fixing 56 may be removed during adjustment of removal of an external item (not shown) which may be located by the current invention.

The central apertures 82 in the base plate 60 and the end cap 50 of the carrier 16 are dimensioned to be preferably slightly greater than an interior diameter of the screw-thread 24 of the screw-threaded opening 22 to allow passage of the fastener 56 axially through the carrier 16 and the fastener engagable element 12.

To place the splayable fastening device 10 in a storage condition as shown in FIGS. 1 and 2, from a splayed condition as shown in FIG. 3, the flexibly springable arm members 14 are wrapped in a coiling manner to circumferentially overlie the exterior surface 68 of their respective wall member 62 and at least part of an adjacent neighbouring arm member 14. The direction of wrapping may be clockwise or anticlockwise around the screw-threaded axis of the screw-threaded opening 22 of the fastener engagable element 12, dependent on which longitudinal edge of the arcuate wall part 20 the arm member 14 extends.

The retainer 18 is utilised to hold the arm members 14 in their wrapped and coiled condition so as to prevent premature unfurling. The retainer 18, in this embodiment, comprises a, preferably rigid metal or plastics, retainer cap 86 and a retainer plug 88. The retainer cap 86 includes a discontinuous skirt 90 providing three equi-angularly spaced depending arms 92. The depending arms 92 are adapted to overlie the engagement tabs 74 of the flexibly springable arm members 14, thereby preventing the arm members 14 from unfurling.

The retainer cap 86 also includes a central aperture 94 which aligns with the screw-threaded opening 22 of the fastener engagable element 12. Crushable axially oriented fins 84 are also preferably provided on an exterior surface 68 of the retainer cap 86. The fins 84 protrude radially sufficiently beyond the coiled outside diameter of the arm members 14 to aid in retaining the splayable fastening device 10 in place when in use and to inhibit rotation of the retainer cap 86.

The retainer plug 88 may conveniently be moulded plastics, and has a base portion 96 dimensioned to fit closely within the screw-threaded opening 22 and two spaced cantilever arms 98 projecting in parallel or substantially parallel from the base portion 96. A distal end 100 of each cantilever arm 98 includes an outwardly projecting flange part 102, whereby the two flange parts 102 form a head 104 of the retainer plug 88. A perimeter edge 106 of each flange part 102 is preferably chamfered from underneath to allow a user's fingers to more easily engage therewith.

An outwardly projecting engagement flange 108 is formed on each cantilever arm 98 of the retainer plug 88 partway between the base portion 96 and the head 104.

With the retainer cap 86 in place and holding the flexibly springable arm members 14 in their wrapped storage condition, the retainer plug 88 is inserted through the aperture 72 in the retainer cap 86 and into the screw-threaded opening 22 of the fastener engagable element 12 by forcing the distal ends of cantilever arms 98 together, inserting the retainer cap into the recess and then releasing said ends. The engagement flanges 108 engage beneath the end cap 50 of the carrier 16, and the head 104 abuts the top surface 110 of the retainer cap 86. The retainer plug 88 thereby prevents or limits undesirable or unintentional removal of the retainer cap 86 and thus unfurling of the arm members 14.

Referring to FIGS. 4 to 7, the splayable fastening device 10 in its coiled storage condition is inserted into a suitably dimensioned hole or wall opening 80 formed in a hollow, for example, plasterboard wall or dry wall 38 until the top surface 110 of the retainer cap 86 is flush or substantially flush with the exterior wall surface 114. The crushable fins 84 of the retainer cap 86 engage with a bore of the wall opening 80 formed in the hollow wall 38. The two flange parts 102 of the head 104 of the retainer plug 88 are squeezed together by the installer's fingers, thereby releasing the engagement flanges 108 from engagement with the end cap 50 and allowing the retainer plug 88 to be extracted and discarded. In this condition, the flexibly springable arm members 14 are retained in their wrapped condition by the bore of the wall opening 80 formed in the hollow wall 38.

A device to be attached to the wall 38 is typically located over the aperture 94 of the retainer cap 86, and a suitably sized screw-threaded fastener 56, typically being a bolt but maybe a screw, is then inserted through the device and into the screw-threaded opening 22 of the fastener engagable element 12. The fastener 56 is wound into the screw-threaded opening 22 until partially home, and the head 116 of the fastener 56 is then pushed towards the retainer cap 86 to force the carrier 16 and flexibly springable arm members 14 through the wall opening 80 and into the void 118 behind. Once clear of the bore of the wall opening 80, the flexibly springable arm members 14 unfurl thereby becoming substantially straight along a majority of their longitudinal extents.

By then tightening the fastener 56, the first edges 32 of the arm members 14 and the engagement tangs 78 of the carrier 16 are drawn into positive engagement with the interior surface 64 of the hollow wall 38. The arm members 14 thus provide load spreading out from the wall opening 80 and anti-rotation as the fastener 56 is further tightened.

The three arm members 14 form a triskelion configuration, reminiscent of the Manx national symbol especially when wrapped in the storage condition.

Although three arm members are described above, two arm members are possible, or more than three arm members can be considered. It may also be possible to utilise only one arm member. In this latter case, the arm member may be a single coil which may extend or substantially extend 360 degrees or beyond around the fastener engagable element.

If a fastener engagable element having only one part is utilised, for example, if it is formed separately of the or each arm member, then the carrier may be dispensed with.

Instead of the fastener engagable element having a screw-threaded opening, a screw-threaded shaft could be utilised, in which case the fastener would be a nut, for example.

Instead of a retainer plug, the retainer cap may be rotatable to release the or each arm member.

Whilst metal parts and assembly methods have been described here by way of example, it will be clearly seen that by using injection moulded plastics techniques and design methods that it is possible to create a single part with the combined functions and features of arm members 14, carrier 16, end cap 50 and screw-thread portions 76. In such a combined component screw threaded portion 76 may be conveniently provided by a threaded hole or by use of a metal threaded insert moulded into or ultrasonically or otherwise inserted into the part It is thus possible to provide a compact splayable fastening device which provides load spreading arm members having an improved longitudinal extent due to them being wrapped or coiled during storage.

The embodiments described above are provided by way of examples only, and various other modifications will be apparent to persons skilled in the field without departing from the scope of the invention as defined by the appended claims.

What is claimed is:

1. A splayable fastening device comprising a fastener engagable element having a screw-threaded element, at least one flexibly springable arm member which is at least in part wrapable about a screw-threaded axis of the screw-threaded element, and a retainer which retains the said flexibly springable arm member in its wrapped condition, wherein the retainer is movable relative to the flexibly springable arm member to enable the flexibly springable arm member to be unfurlable in at least one of a clockwise and anticlockwise direction.

2. A splayable fastening device as claimed in claim 1, wherein a plurality of said flexibly springable arm members is provided.

3. A splayable fastening device as claimed in claim 2, wherein each said flexibly springable arm member is wrapable to overlie at least part of a neighbouring flexibly springable arm member.

4. A splayable fastening device as claimed in claim 1, wherein the fastener engagable element has at least two separate arcuate wall parts forming longitudinal wall sections of the screw threaded element.

5. A splayable fastening device as claimed in claim 4, wherein the fastener engagable element has three said arcuate wall parts forming three said longitudinal wall sections of the screw threaded element.

6. A splayable fastening device as claimed in claim 4, wherein a said flexibly springable arm member is integrally formed as one piece with a respective said arcuate wall part of the fastener engagable element.

7. A splayable fastening device as claimed in claim 1, further comprising a carrier which carries the fastener engagable element and the said at least one flexibly springable arm member.

8. A splayable fastening device as claimed in claim 7, wherein the carrier includes an arcuate bore in which the fastener engagable element is seatable.

9. A splayable fastening device as claimed in claim 7, wherein the carrier includes a longitudinal slot through which the said flexibly springable arm member extends.

10. A splayable fastening device as claimed in claim 7, wherein the carrier includes an end cap which retains the fastener engagable element and the said flexibly springable arm member.

11. A splayable fastening device as claimed in claim 7, wherein the carrier includes at least one radially outwardly projecting tang which prevents or inhibits pull out of the in use carrier.

12. A splayable fastening device as claimed in claim 1, wherein the retainer includes a retainer cap which overlies at least part of an edge of the flexibly springable arm member whereby the flexibly springable arm member is retained in its coiled condition.

13. A splayable fastening device as claimed in claim 12, wherein the retainer further includes a removable retainer plug which maintains engagement of the retainer cap with the flexibly springable arm member.

14. A splayable fastening device as claimed in claim 13, wherein the retainer plug includes a base and two cantilevered arms which project therefrom, distal ends of the cantilevered arms having flanges forming a head of the retainer plug and secondary flanges partway between the base and the distal ends.

15. A splayable fastening device as claimed in claim 1, wherein the retainer includes a plurality of longitudinal crushable fins which project radially outwardly.

16. A splayable fastening device as claimed in claim 1, further comprising a screw-threaded fastener engagable with the screw-threaded element of the fastener engagable element.

17. A method of fastening to a hollow wall using a splayable fastening device, the method comprising the steps of
   a) providing an opening in a hollow wall having a diameter which closely matches that of a retainer of the splayable fastening device;
   b) inserting the splayable fastening device into the wall opening until the retainer is flush or substantially flush with the outer surface of the wall;
   c) engaging a screw-threaded fastener with a screw-threaded element of a fastener engagable element of the splayable fastening device; and
   d) urging the screw-threaded fastener into the wall opening so that a wrapped flexibly springable arm member, which is retained by the retainer in its wrapped condition and at least in part wrapable about a screw-threaded axis of the screw-threaded element, disengages from the retainer and until the fastener engagable element and the said at least one flexibly springable arm member exit the wall opening, whereby the said at least one flexibly springable arm member unfurls in at least one of a clockwise and anticlockwise direction so as to be engagable with an interior wall surface of the hollow wall which extends from the wall opening.

* * * * *